US006453426B1

(12) United States Patent
Gamache et al.

(10) Patent No.: US 6,453,426 B1
(45) Date of Patent: Sep. 17, 2002

(54) SEPARATELY STORING CORE BOOT DATA AND CLUSTER CONFIGURATION DATA IN A SERVER CLUSTER

(75) Inventors: Rod Gamache, Issaquah; Michael T. Massa, Seattle; Patrick J. Helland, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/277,503

(22) Filed: Mar. 26, 1999

(51) Int. Cl.[7] .............................. H02H 3/05; G06F 11/00
(52) U.S. Cl. ................................ 714/4; 713/2; 709/249
(58) Field of Search ............................. 714/4, 5; 713/1, 713/2, 100; 709/201, 220, 221, 249, 203; 370/901, 908; 434/365

(56) References Cited

U.S. PATENT DOCUMENTS

| | | | |
|---|---|---|---|
| 5,280,627 A | | 1/1994 | Flaherty et al. |
| 5,404,527 A | * | 4/1995 | Irwin et al. |
| 5,553,239 A | | 9/1996 | Heath et al. |
| 5,659,748 A | | 8/1997 | Kennedy |
| 5,673,384 A | | 9/1997 | Hepner et al. |
| 5,727,206 A | | 3/1998 | Fish et al. |
| 5,754,821 A | | 5/1998 | Cripe et al. |
| 5,781,910 A | | 7/1998 | Gostanian et al. |
| 5,828,876 A | | 10/1998 | Fish et al. |
| 5,828,889 A | | 10/1998 | Moiin et al. |
| 5,835,784 A | * | 11/1998 | Gillespie et al. |
| 5,892,913 A | | 4/1999 | Adiga et al. |
| 5,893,086 A | | 4/1999 | Schmuck et al. |
| 5,909,540 A | | 6/1999 | Carter et al. |
| 5,917,998 A | | 6/1999 | Cabrera et al. |
| 5,918,229 A | | 6/1999 | Davis et al. |
| 5,927,050 A | * | 7/1999 | Houck et al. |
| 5,940,838 A | | 8/1999 | Schmuck et al. |
| 5,946,686 A | | 8/1999 | Schmuck et al. |
| 5,948,109 A | | 9/1999 | Moiin et al. |
| 5,974,547 A | * | 10/1999 | Klimenko |
| 5,996,075 A | | 11/1999 | Matena |
| 5,999,712 A | | 12/1999 | Moiin et al. |
| 6,014,669 A | | 1/2000 | Slaughter et al. |
| 6,108,781 A | * | 8/2000 | Jayakumar |
| 6,301,462 B1 | * | 10/2001 | Freeman et al. |
| 6,360,331 B2 | * | 3/2002 | Vert et al. |

FOREIGN PATENT DOCUMENTS

| | | |
|---|---|---|
| EP | 0 760 503 | 3/1997 |
| EP | 0 887 731 | 12/1998 |

OTHER PUBLICATIONS

Copy of International Search Report in Corresponding foreign application No. PCT/US00/05890.
Carr, Richard. "The Tandom Global Update Protocol." *Tandem Systems Review*, vol. 1, No. 2, pp. 74–85 (Jun. 1995).
Gifford, David K., "Weighted Voting for Replicated Data." pp. 150–159 (1979).
Lamport, Leslie, *A Fast Mutual Exclusion Algorithm*, Digital Equipment Corporation (Nov. 14, 1985).
Lamport, Leslie, *The Part–Time Parliament*, Digital Equipment Corporation (Sep. 1, 1989).

* cited by examiner

*Primary Examiner*—Gopal C. Ray
(74) *Attorney, Agent, or Firm*—The Law Offices of Albert S. Michalik, PLLC

(57) ABSTRACT

A method and system for distributing various types of cluster data among various storage devices of a server cluster. Cluster core boot data that is needed to get the cluster up and running is stored on a quorum storage mechanism, separate from cluster configuration data which is stored on lower cost and/or higher performance storage. The quorum storage may be implemented via a quorum of nodes, a single quorum disk or a quorum of replica members. The state of the cluster configuration data, as well as the state of other cluster data, may be stored on the quorum storage, thereby assuring the integrity of the data while providing increased reliability through the use of mirror sets of storage elements or the like for storing that data. Significant flexibility in how a cluster may be configured is achieved, along with improved cluster performance and scalability.

52 Claims, 12 Drawing Sheets

SEPARATELY STORING CORE BOOT DATA AND CLUSTER CONFIGURATION DATA IN A SERVER CLUSTER

FIELD OF THE INVENTION

The invention relates generally to computer network servers, and more particularly to computer servers arranged in a server cluster.

BACKGROUND OF THE INVENTION

A server cluster ordinarily is a group of at least two independent servers connected by a network and utilized as a single system. The clustering of servers provides a number of benefits over independent servers. One important benefit is that cluster software, which is run on each of the servers in a cluster, automatically detects application failures or the failure of another server in the cluster. Upon detection of such failures, failed applications and the like can be terminated and restarted on a surviving server.

Other benefits of clusters include the ability for administrators to inspect the status of cluster resources, and accordingly balance workloads among different servers in the cluster to improve performance. Such manageability also provides administrators with the ability to update one server in a cluster without taking important data and applications offline for the duration of the maintenance activity. As can be appreciated, server clusters are used in critical database management, file and intranet data sharing, messaging, general business applications and the like.

Because clusters often deal with critical applications, clusters need to be highly reliable and available. As a result, the data that is needed to operate a cluster, referred to herein as the cluster operational data, also must be highly available, persistent, and consistent. Such cluster operational data includes information about the servers in the cluster (cluster membership), network topology information, the applications installed on the cluster and how to handle failures (failover policies).

Prior clustering technology required that each node (system) of a cluster possess its own replica of the cluster operational data, and that a majority of possible nodes of a cluster be functional in order to have a valid cluster. This ensured that at least one node in any given set of nodes in a cluster was common to any previous cluster, and thus overcomes partitioning problems (wherein nodes of a cluster become separated or a new cluster is formed later in time). More particularly, requiring a majority of nodes be operational to have a cluster ensures that only one cluster can operate at a time and any new cluster that is formed has at least one node in common with the previous cluster and thus a copy of the correct cluster operational data.

A recent improvement described in U.S. patent application Ser. No. 08/963,050, U.S. Pat. No. 6,279,032, assigned to the assignee of the present invention and hereby incorporated by reference in its entirety, provides the cluster operational data on a single quorum device (e.g., a disk) for which cluster nodes arbitrate for ownership. Because the correct data needed to operate a cluster is on the single quorum device, partitioning problems are solved, as a cluster may be formed as long as a node of that cluster has ownership of the quorum device. This further increases cluster availability, since at a minimum, only one node and the quorum device are needed to have a working cluster. While this is a significant improvement over requiring a majority of nodes to have a cluster, a single quorum device is inherently not reliable, and thus to increase cluster availability, expensive hardware-based solutions are presently employed to provide highly-reliable single quorum device for storage of the operational data. The cost of the highly-reliable storage device is a major portion of the cluster expense.

Yet another significant improvement directed to quorum storage is described in the copending U.S. patent application Ser. No. 09/277,450, entitled "Method and System for Consistent Cluster Operational Data in a Server Cluster Using a Quorum of Replicas," assigned to the assignee of the present invention, filed concurrently herewith, and hereby incorporated by reference in its entirety. In the solution described therein, the cluster operational data is replicated to a plurality (replica set) of storage devices that are independent from any given node of a cluster. To form and operate as a cluster, a node arbitrates for and gains exclusive possession over a quorum (majority) of the replica set. This solves partitioning problems by ensuring that only one cluster can operate at a time, and that at least one replica storage device in any given set of nodes in a cluster was common to any previous cluster, whereby that the new cluster has at least one copy of the correct cluster operational data. Use of the replica set method and system to store the cluster operational data is generally preferable over the other methods/systems because it requires only a small number of relatively inexpensive components to form a cluster, thereby increasing availability relative to the quorum of nodes solution, while lowering cost relative to the single quorum device solution.

Regardless of the type of storage used for the cluster operational data, the performance and size of a cluster is limited by the rate at which the operational data can be updated, in part because such updates are relatively slow, comprising careful transactional logging of changes. As a result, the existing solutions for storing the cluster operational data do not scale well to large clusters, since the larger the cluster, the more updates need to be made to that data. Moreover, the cost of updating the operational data is higher when it is replicated to multiple devices, as in the preferred replica set solution. In sum, there are tradeoffs and limitations resulting from having to store the cluster operational data in a highly-reliable manner with complete integrity as required in typical clustering applications, while also providing performance and scalability.

SUMMARY OF THE INVENTION

Briefly, the present invention provides a method and system for distributing various types of cluster operational data among various storage devices of the cluster, permitting. the use of relatively higher performance and/or less-costly techniques for storing some of the cluster operational data, thereby facilitating larger clusters. To this end, one type of cluster operational data, referred to herein as the cluster's core boot data, which includes information needed to get the cluster up and running, (e.g., cluster membership information and network topology), is maintained on some type of quorum storage mechanism. The quorum storage may be implemented via a quorum of nodes, a single highly-reliable quorum disk or a quorum of replica (disk) members. The other cluster operational data, referred to herein as the cluster configuration data, which may include information about the applications installed on the cluster and failover policies, is maintained on one or more separate storage elements, generally on cheaper and/or higher performance storage elements such as a two-element mirror set. The cluster configuration data comprises the majority of the cluster operational data, and is updated relatively frequently when compared to updates to the core boot data. As a result, storing the cluster configuration data on the higher performance and/or less-costly storage provides significant benefits.

In addition, the state of those separate storage elements may be maintained with the core boot data on the quorum storage, providing high-reliability while ensuring the integrity of the cluster configuration data. On the quorum storage, the state information is available to any cluster node and is not subject to partitioning problems. State information for other cluster data such as application data and/or the state of its storage mechanisms may be similarly maintained, enabling the use of mirror sets or the like for this other data whereby the other data is consistent, reliable and available.

Significant flexibility in how a cluster may be configured is achieved, along with improved performance and better scalability. For example, when mirror sets are used for the cluster configuration data, the mirror sets provide simpler, higher-performance, lower-cost storage devices with high reliability. Mirror sets thus may be used for the cluster configuration data, while a quorum solution is used to provide the storage for the core boot data, and the status information of the mirror set.

Other benefits and advantages will become apparent from the following detailed description when taken in conjunction with the drawings, in which:

DETAILED DESCRIPTION OF THE PREFERRED EMBODIMENT

Exemplary Operating Environment

Figure 1:
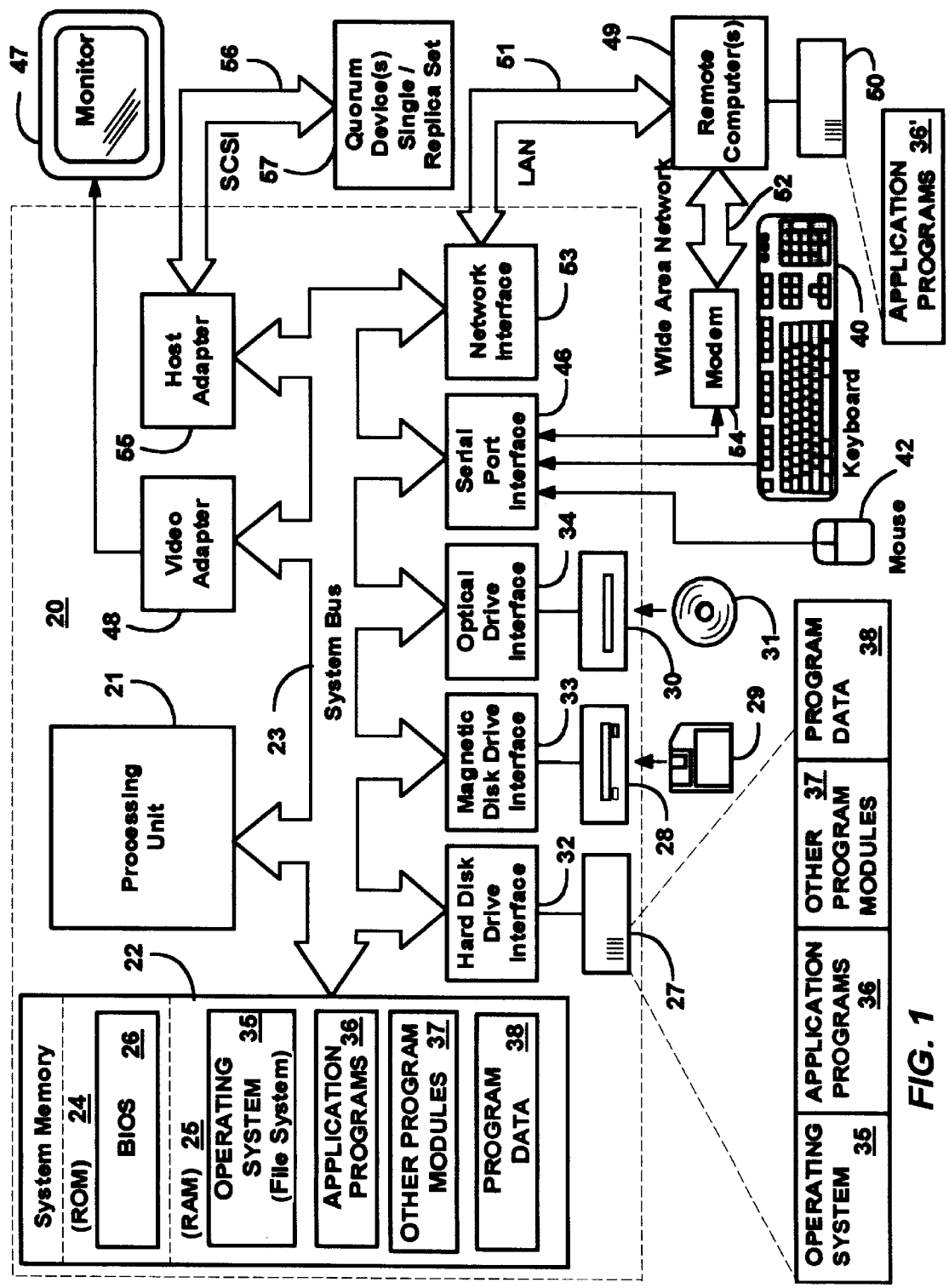
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like acting as a node (i.e., system) in a clustering environment. The computer 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (which may be considered as including or operatively connected to a file system), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 operates in a networked environment using logical connections to one or more remote computers 49. At least one such remote computer 49 is another system of a cluster communicating with the personal computer system 20 over the networked connection. Other remote computers 49 may be another personal computer such as a client computer, a server, a router, a network PC, a peer device or other common network system, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet. Other mechanisms suitable for connecting computers to form a cluster include direct connections such as over a serial or parallel cable, as well as wireless connections. When used in a LAN networking environment, as is typical for connecting systems of a cluster, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Lastly, in certain embodiments, (described below with respect to FIGS. 4B and 4C), a host adapter 55 or the like connects the system bus 23 to a SCSI (Small Computer Systems Interface) bus 56 for communicating with one or more quorum devices 57. Note that in those embodiments, the remote computer or computers 49 similarly connect via the bus 56 to the quorum device or devices 57. Other ways of connecting cluster systems to storage devices, such as for use as quorum devices, including Fibre Channel, are equivalent. Indeed, one alternative way to connect storage devices is via a network connection, as described in U.S. patent application Ser. No. 09/260,194 entitled "Method and System for Remote Access of Computer Devices," assigned to the assignee of the present invention and hereby incorporated by reference in its entirety.

Cluster Service Components

Figure 2:
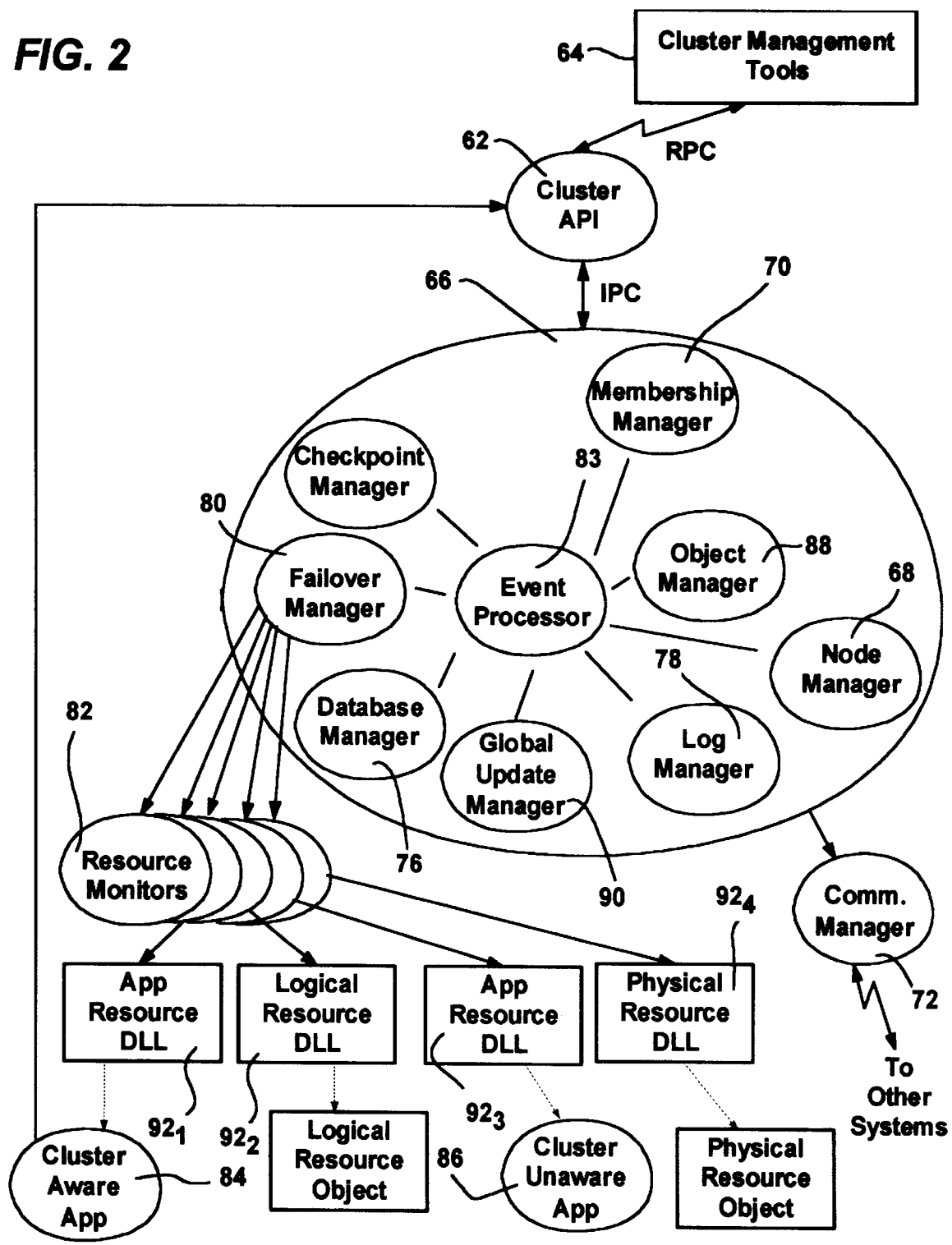
FIG. 2 is a representation of various components within the clustering service of a machine.
Figure 4A:
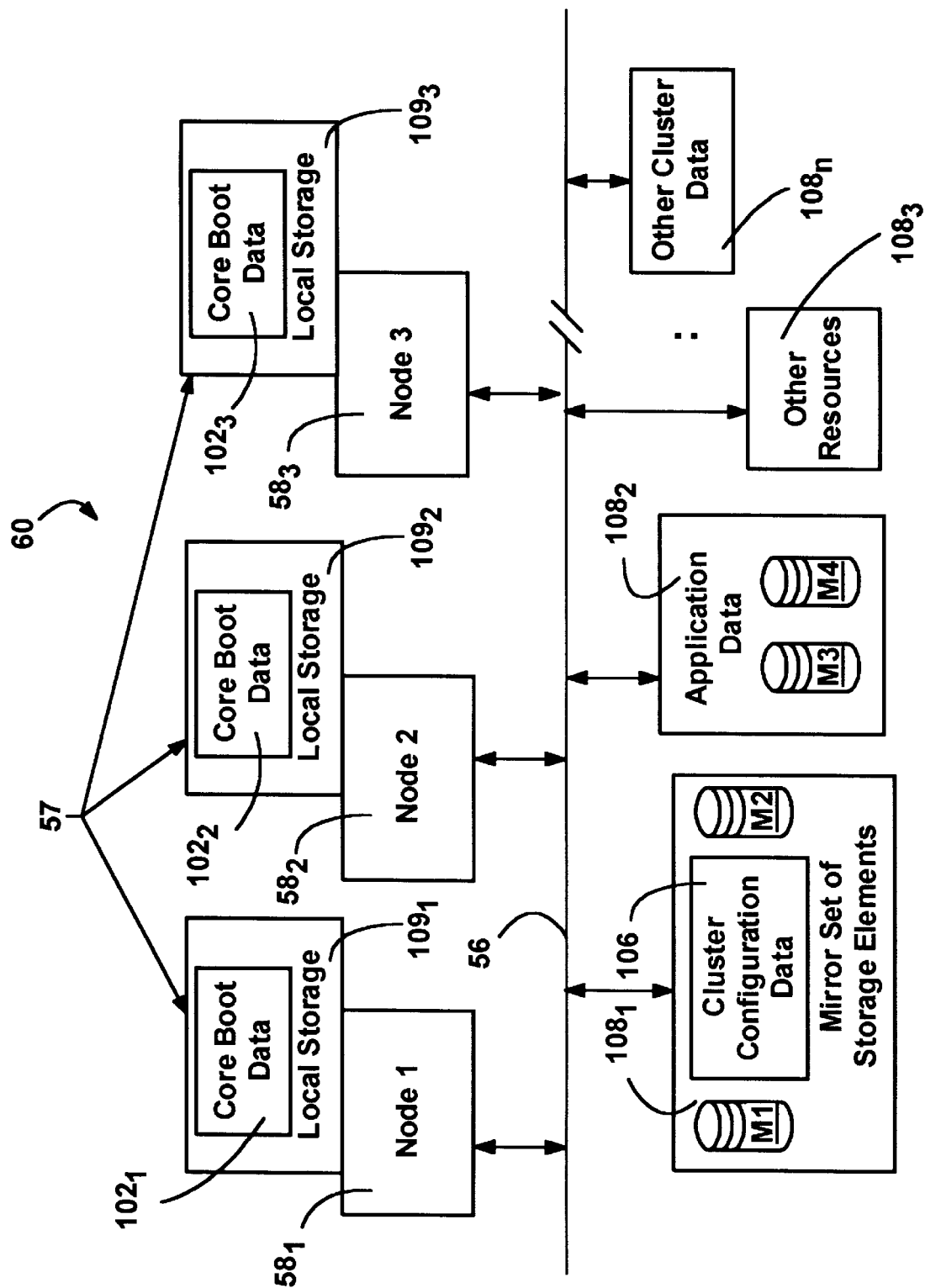
FIGS. 4A–4C are block diagrams representing server clusters having distributed data in accordance with one aspect of the present invention.
Figure 4B:
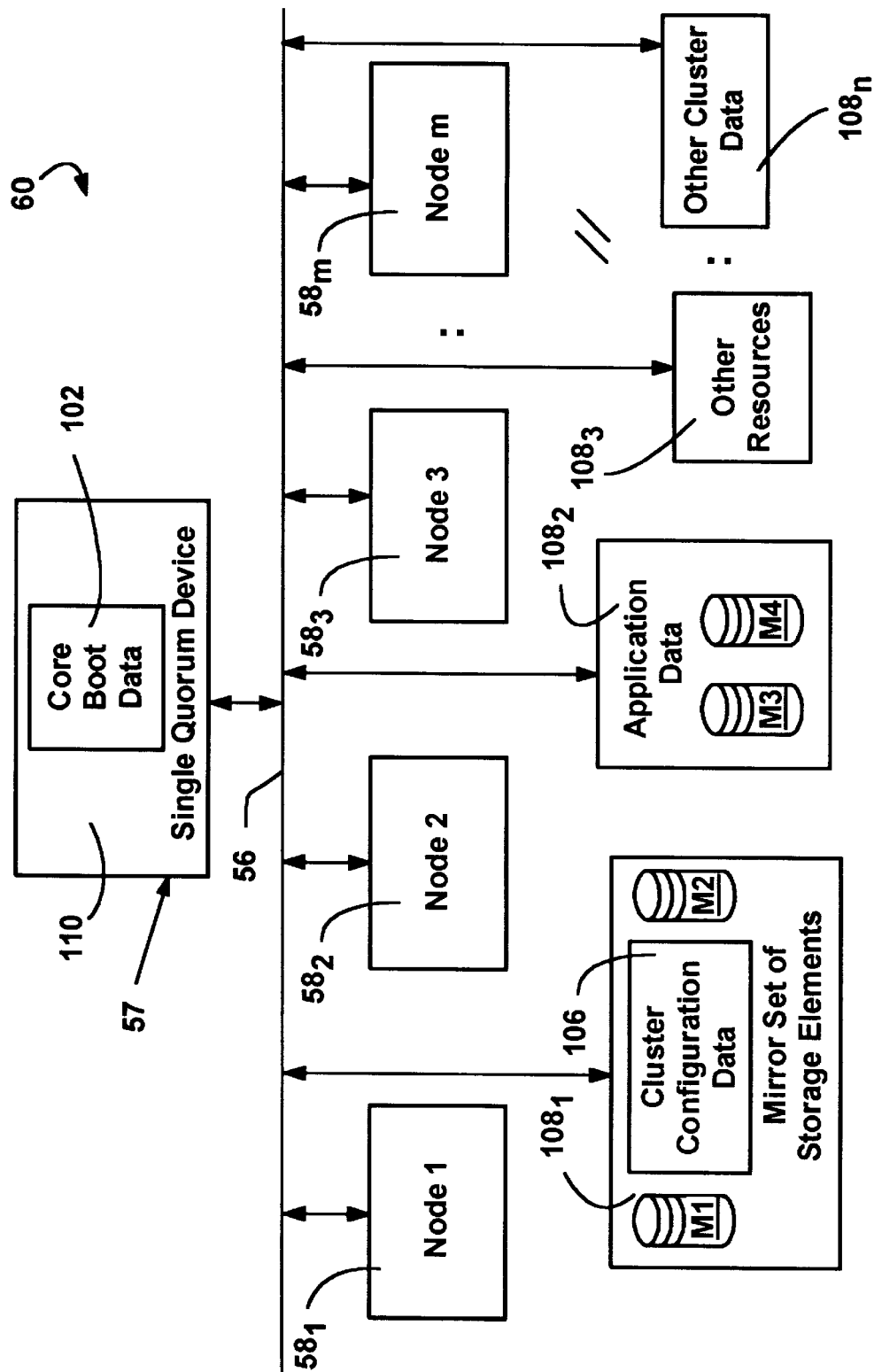

FIG. 2 provides a representation of cluster service components and their general relationships in each of the nodes $58_1$–$58_m$ (FIG. 4B) of a Windows NT cluster 60, (e.g., the system 20 of FIG. 1 comprises the node $58_1$ of FIG. 4B). As shown in FIG. 2, to accomplish cluster creation and to perform other administration of cluster resources, nodes, and the cluster itself, a cluster application programming interface (API) 62 is provided. Applications and cluster management administration tools 64 call various interfaces in the API 62 using remote procedure invocations through RPC or DCOM (Distributed Component Object Model), whether running in the cluster or on an external system. The various interfaces of the API 62 may be considered as being categorized by their association with a particular cluster component, i.e., nodes, resources and the cluster itself.

An administrator typically works with groups, each group being a collection of resources (e.g., cluster application resources, names and addresses) organized to allow an administrator to combine resources into larger logical units and manage them as a unit. Usually a group contains all of the elements needed to run a specific application, and for client systems to connect to the service provided by the application. For example, a group may include an application that depends on a network name, which in turn depends on an Internet Protocol (IP) address, all of which are collected in a single group. In a preferred arrangement, the dependencies of all resources in the group are maintained in a directed acyclic graph, known as a dependency tree. Group operations performed on a group affect all resources contained within that group. Dependency trees are described in more detail in U.S. patent application Ser. No. 08/963,049, U.S. Pat. No. 6,178,529, entitled "Method and System for Resource Monitoring of Disparate Resources in a Server Cluster," assigned to the same assignee as the present invention and hereby incorporated by reference in its entirety.

A cluster service 66 controls the cluster operation on a server cluster 60 (e.g., FIG. 4B), and is preferably implemented as a Windows NT service. The cluster service 66 includes a node manager 68, which manages node configuration information and network configuration information (e.g., the paths between nodes $58_1$–$58_m$). The node manager 68 operates in conjunction with a membership manager 70, which runs the protocols that determine what cluster membership is when a change (e.g., regroup) occurs. A communications manager 72 (kernel driver) manages communications with other nodes of the cluster 60 via one or more network paths. The communications manager 72 sends periodic messages, called heartbeats, to counterpart components on the other nodes of the cluster 60 to provide a mechanism for detecting that the communications path is good and that the other nodes are operational. Through the communications manager 72, the cluster service 66 is essentially in constant communication with the other nodes $58_1$–$58_m$ of the cluster 60. In a small cluster, communication is fully connected, i.e., all nodes of the cluster 60 are in direct communication with all other nodes. In a large cluster, direct communication may not be possible or desirable for performance reasons.

Nodes $58_1$–$58_m$ in the cluster 60 have the same view of cluster membership, and in the event that one node detects a communication failure with another node, the detecting node broadcasts a message to nodes of the cluster 60 causing other members to verify their view of the current cluster membership. This is known as a regroup event, during which writes to potentially shared devices are disabled until the membership has stabilized. If a node does not respond, it is removed from the cluster 60 and its active groups are failed over ("pulled") to one or more active nodes. Note that the failure of the cluster service 66 also causes its locally managed resources to fail.

The cluster service 66 also includes a configuration database manager 76 which implements the functions that maintain cluster operational data, i.e., information about the physical and logical entities in the cluster 60, as described below. As further described below and in accordance with one aspect of the present invention, the cluster operational data is split into core boot data and cluster configuration data, and is maintained in two cluster databases. The core-boot data is stored in a database on the quorum storage mechanism 57, while the cluster configuration data is stored in a database on a higher performance/lower cost storage mechanism such as a mirror set of storage elements. Note that the cluster software is aware that the core boot data may be replicated to multiple storage devices, and that the core boot data has a log per storage device as described in the aforementioned U.S. patent application Ser. No. 09/277,450, entitled "Method and System for Consistent Cluster Operational Data in a Server Cluster Using a Quorum of Replicas." However, the cluster software views the mirror set storage as a single storage device and is generally not cognizant of the replication (which is maintained at a lower level). Thus, the cluster configuration information is viewed by the cluster software as a single database with a single log. Further, note that both persistent and volatile information may be used to track the current and desired state of the cluster, e.g., a copy of one or both of the databases may also reside on each node. The database manager 76 may cooperate with counterpart database managers of nodes in the cluster 60 to maintain certain cluster information consistently across the cluster 60. Global updates may be used to ensure the consistency of the cluster database in each of the nodes $58_1$–$58_m$.

A logging manager 78 provides a facility that works with the database manager 76 of the cluster service 66 to maintain cluster state information across a situation in which a cluster shuts down and a new cluster is later formed with no nodes necessarily being common to the previous cluster, known as a temporal partition. The logging manager 78 operates with the log file, preferably maintained in a highly reliable storage, to unroll logged state changes when forming a new cluster following a temporal partition.

A failover manager 80 makes resource/group management decisions and initiates appropriate actions, such as startup, restart and failover. The failover manager 80 is responsible for stopping and starting the node's resources, managing resource dependencies, and for initiating failover of groups. The failover manager 80 receives resource and node state information from at least one resource monitor 82 and the node manager 68, for example, to make decisions about groups. The failover manager 80 is responsible for deciding which nodes in the cluster should "own" which groups. Those nodes that own individual groups turn control of the resources within the group over to their respective failover managers 80.

An event processor 83 connects the components of the cluster service 66 via an event notification mechanism. The event processor 83 propagates events to and from cluster-aware applications (e.g., 84) and to and from the components within the cluster service 66. An object manager 88 maintains various cluster objects. A global update manager 90 operates to provide a global, atomic and consistent update service that is used by other components within the Cluster Service 66. The global update protocol (GLUP) is used by the global update manager 90 to broadcast updates to each node $58_1$–$58_m$ in a cluster 60. GLUP generally comprises a standard global update message format, state information maintained in each node, and a set of rules that specify how global update should be processed and what steps should be taken when failures occur.

In general, according to the GLUP protocol, one node (e.g. $58_1$ of FIG. 4A) serves as a "locker" node. The locker node $58_1$ ensures that only one global update is in progress at any given time. With GLUP, a node (e.g., $58_2$) wishing to send an update to other nodes first sends a request to the locker node $58_1$. When any preceding updates are complete, the locker node $58_1$ gives permission for this "sender" node $58_2$ to broadcast its update to the other nodes in the cluster. In accordance with GLUP, the sender node $58_2$ sends the updates, one at a time, to the other nodes in a predetermined GLUP order that is ordinarily based on a unique number assigned to each node. GLUP can be utilized to replicate data to the machines of a cluster, including at least some of the cluster operational data, as described below. A more detailed discussion of the GLUP protocol is described in the publication entitled "Tandem Systems Review" Volume 1, Number 2, June, 1985 pp. 74–84, which is incorporated by reference herein.

A resource monitor 82 runs in one or more processes that may be part of the cluster service 66, but are shown herein as being separate from the cluster service 66 and communicating therewith via Remote Procedure Calls (RPC) or the like. The resource monitor 82 monitors the health of one or more resources (e.g., $92_1$–$92_4$) via callbacks thereto. The monitoring and general operation of resources is described in more detail in the aforementioned U.S. patent application Ser. No. 08/963,049, U.S. Pat. No. 6,178,529.

The resources (e.g., $92_1$–$92_4$) are implemented as one or more Dynamically Linked Libraries (DLLs) loaded into the address space of the Resource Monitor 82. For example, resource DLLs may include physical disk, logical volume (consisting of one or more physical disks), file and print shares, network addresses and names, generic service or application, and Internet Server service DLLs. Certain resources (e.g., provided by a single source) may be run in a single process, while other resources may be run in at least one other process. The resources $92_1$–$92_4$ run in the system account and are considered privileged code. Resources $92_1$–$92_4$ may be defined to run in separate processes, created by the cluster service 66 when creating resources.

Resources expose interfaces and properties to the cluster service 66, and may depend on other resources, with no circular dependencies allowed. If a resource does depend on other resources, the resource is brought online after the resources on which it depends are already online, and is taken offline before those resources. Moreover, each resource has an associated list of nodes in the cluster on which this resource may execute. For example, a disk resource may only be hosted on nodes that are physically connected to the disk. Also associated with each resource is a local restart policy, defining the desired action in the event that the resource cannot continue on the current node.

Nodes $58_1$–$58_m$ in the cluster need to maintain a consistent view of time. One of the nodes, known as the time source and selected by the administrator, includes a resource that implements the time service. Note that the time service, which maintains consistent time within the cluster 60, is implemented as a resource rather than as part of the cluster service 66 itself.

From the point of view of other nodes in the cluster 60 and management interfaces, nodes in the cluster 60 may be in one of three distinct states, offline, online or paused. These states are visible to other nodes in the cluster 60, and thus may be considered the state of the cluster service 66. When offline, a node is not a fully active member of the cluster 60. The node and its cluster service 66 may or may not be running. When online, a node is a fully active member of the cluster 60, and honors cluster database updates, maintains heartbeats, and can own and run groups. Lastly, a paused node is a fully active member of the cluster 60, and thus honors cluster database updates and maintains heartbeats. Online and paused are treated as equivalent states by most of the cluster software, however, a node that is in the paused state cannot honor requests to take ownership of groups. The paused state is provided to allow certain maintenance to be performed.

Note that after initialization is complete, the external state of the node is offline. To join a cluster, following the restart of a node, the cluster service 66 is started automatically. The node configures and mounts local, non-shared devices. Cluster-wide devices are left offline while booting, because they may be in use by another node. The node tries to communicate over the network with the last known members of the cluster 60. When the node discovers any member of the cluster, it performs an authentication sequence wherein the existing cluster node authenticates the newcomer and returns a status of success if authenticated, or fails the request if not. For example, if a node is not recognized as a member or its credentials are invalid, then the request to join the cluster is refused. If successful, the newcomer may be sent an updated copy of the shared core boot data and cluster configuration data databases. The joining node may use these databases to find shared resources and to bring them online as needed, and also to find other cluster members. If a cluster is not found during the discovery process, a node will attempt to form its own cluster, e.g., in a preferred embodiment, by acquiring control of a quorum of the replica devices.

Once online, a node can have groups thereon. A group can be "owned" by only one node at a time, and the individual resources within a group are present on the node which currently owns the group. As a result, at any given instant, different resources within the same group cannot be owned by different nodes across the cluster. Groups can be failed over or moved from one node to another as atomic units. Each group has a cluster-wide policy associated therewith comprising an ordered list of owners. A group fails over to nodes in the listed order.

For example, if a resource (e.g., an application) fails, the failover manager 80 may choose to restart the resource, or to take the resource offline along with any resources dependent thereon. If the failover manager 80 takes the resource offline, the group is restarted on another node in the cluster, known as pushing the group to another node. A cluster administrator may also manually initiate such a group transfer. Both situations are similar, except that resources are gracefully shutdown for a manually initiated failover, while they are forcefully shut down in the failure case.

When an entire node in the cluster 60 fails, its groups are pulled from the failed node to another node. This process is similar to pushing a group, but without the shutdown phase on the failed node. To determine what groups were running on the failed node, the nodes maintain group information on each node of the cluster in one of the databases to track which nodes own which groups. To determine which node should take ownership of which groups, those nodes capable of hosting the groups negotiate among themselves for ownership, based on node capabilities, current load, application feedback and/or the group's node preference list. Once negotiation of a group is complete, all members of the cluster update their databases to properly reflect which nodes own which groups.

When a previously failed node comes back online, the failover manager 80 decides whether to move some groups back to that node, in an action referred to as failback. To automatically failback, groups require a defined preferred owner. There may be an ordered list of preferred owners in a cluster of more than two nodes. Groups for which the newly online node is the preferred owner are pushed from the current owner to the new node. Protection, in the form of a timing window, is included to control when the failback occurs.

Data Distribution

In accordance with one aspect of the present invention, the information needed to form and operate a cluster 60, i.e., the cluster operational data 100 (FIG. 3), is distributed among at least two distinct storages in the cluster 60. A first type of cluster operational data 100, the core boot data 102, is preferably stored in highly-reliable quorum storage 57 (FIGS. 4A–4C). A second type of operational data, the cluster configuration data 106, is preferably stored in a highly-reliable, but less expensive and/or higher performance storage mechanism, such as a mirror set of storage elements (disks) $108_1$ (FIGS. 4A–4C). These storage elements $108_1$ may be connected to the cluster 60 of networked nodes $58_1$–$58_m$ in virtually any manner, but generally are connected the same way as the quorum storage, e.g., via the SCSI bus 56. Also, other types of storage elements and/or shared data, such as application data $108_2$ and other resources and data $108_3$–$108_n$ may be connected. By separating the cluster configuration data 106 from the core boot data 102, a number of benefits are obtained, including reduced cost due to a lesser-amount of expensive and lower performance quorum storage 57 being needed, and better scalability due to better performance and a reduction in the total number of (relatively slow) updates needed to the quorum storage mechanism 57.

Figure 3:
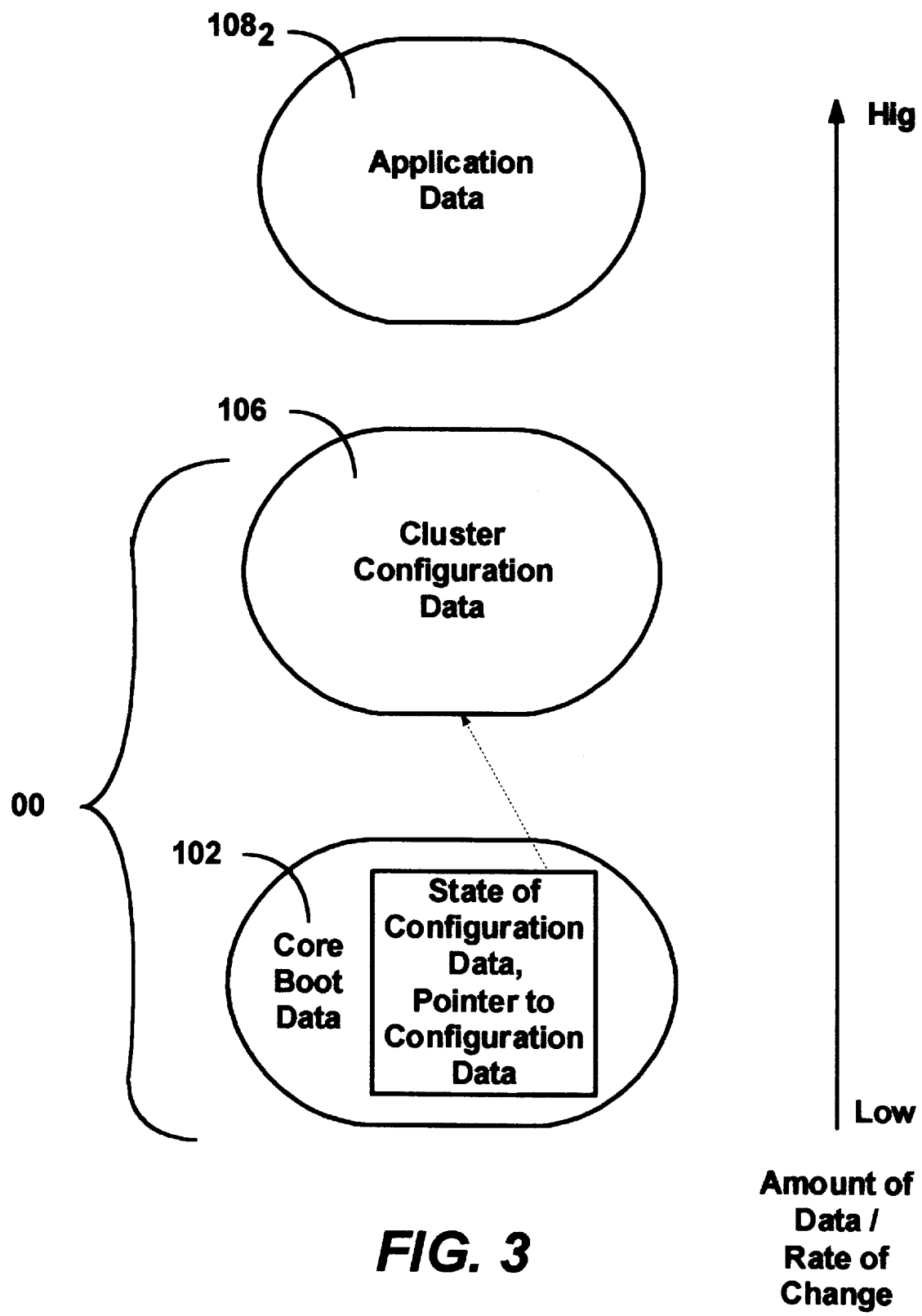
FIG. 3 is a diagram representing the distribution of data in a cluster in accordance with one aspect of the present invention.
Figure 4C:
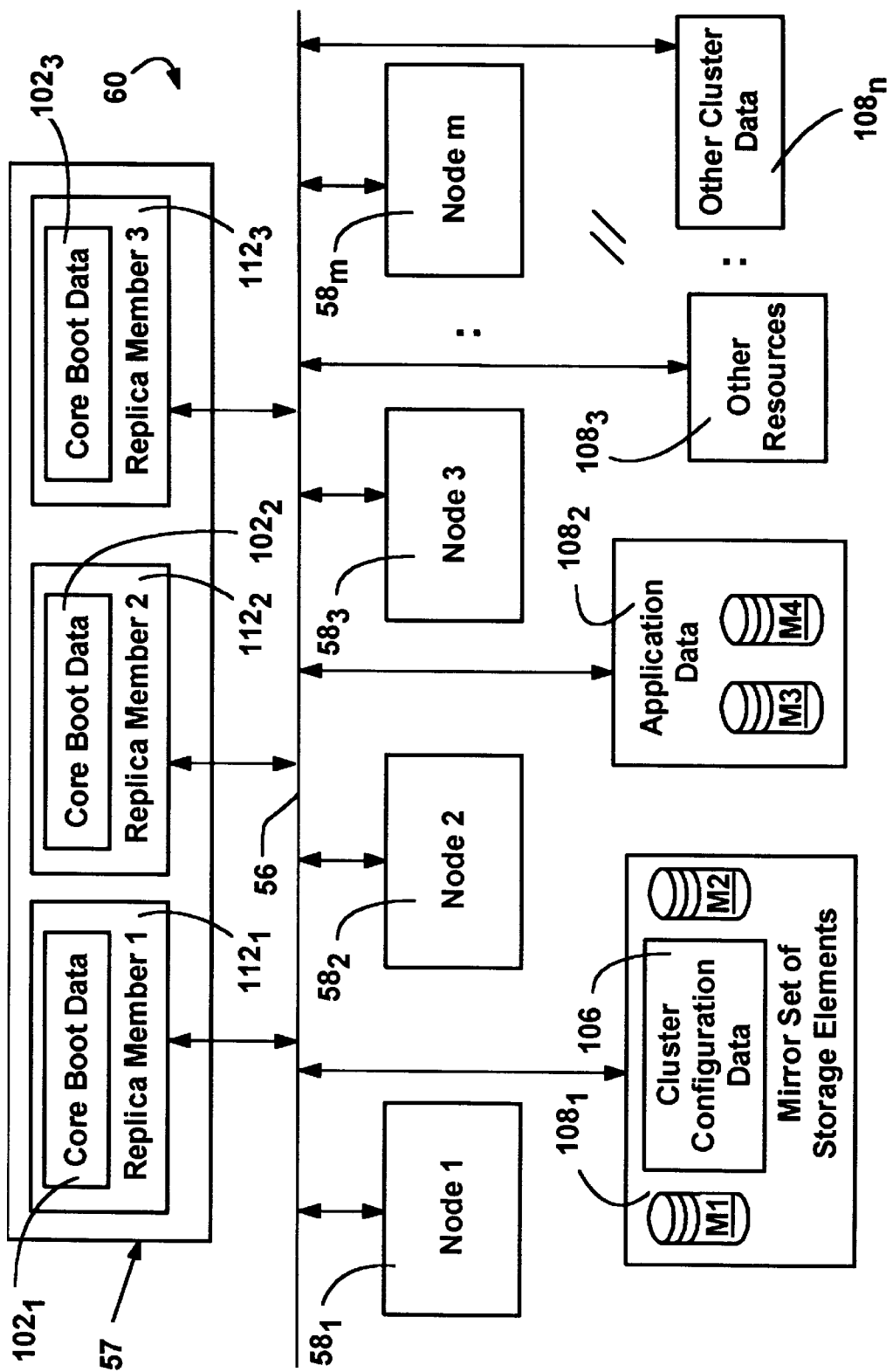

As shown in FIG. 3, the core boot data 102, which includes information on node membership and network topology, changes relatively infrequently and the amount of data written is relatively low. The core boot data 102 may be selected as essentially comprising only that information that is needed to get a cluster up and running. Notwithstanding, other information may be stored with the core boot data, including certain state information, as described below. For the cluster configuration data 106, which preferably includes information as to which applications are installed, and how to handle resource failures, i.e., failover policies, the frequency of updates and amount of data written is somewhat higher. The cluster configuration data 106 is essentially the information that configures the functionality of an up-and-running cluster. Lastly, FIG. 3 shows the application data $108_2$, such as financial transactions logged to a finance database, as comprising a large amount of data being read and written at a high frequency, such as on the order of tens of thousands of updates per second.

In general, the present invention is highly flexible as to how the cluster configuration data 106 is stored, and provides for an administrator to decide how and where to store the data based on factors such as number and types of storage devices available, desired access speed, availability and reliability, quantity of data and so on. For example, high performance, relatively inexpensive storage, such as a mirror set $108_1$ of storage elements M1 and M2 (FIG. 4A), may be used for storing the cluster configuration data 106.

The integrity and availability of the core boot data 102 of the cluster is assured through the use of some type of quorum storage mechanism 57, wherein in general, a quorum ensures that any changes that occur during the operation of one cluster are known to any subsequent cluster that is formed, regardless of which combination of elements is in the subsequent cluster. In other words, a quorum requirement ensures that changes to the cluster operational data survive a temporal partition, and ensures that only one cluster may operate at any time. One type of quorum storage mechanism 57, shown in FIG. 4A, is provided by locally storing a replica $102_1$–$102_3$ of the core boot data in a local storage $109_1$–$109_3$ of each node $58_1$–$58_3$, and then requiring that a majority of the nodes $58_1$–$58_3$ be operational to form a cluster. In keeping with the invention, in this "majority of nodes" configuration (FIG. 4A), at least one node from any previous quorum is common to any next quorum, and thus that next cluster has the most up-to-date core boot data 102 via the common node. Note that among a set of nodes, the node with the most up-to-date core boot data 102 in a newly-formed cluster is known because changes to the core boot data 102 are logged with monotonically increasing sequence numbers.

Alternatively, as shown in FIG. 4B, a second type of quorum storage mechanism 57 may be provided via a single quorum device 110 (e.g., a highly-reliable disk) which stores the core boot data 102 in accordance with the present invention. Ownership of the single quorum device 110 by one node determines the cluster, because a node only belongs to one cluster at a time, and the only set of nodes that can form and maintain a valid cluster includes the node therein having ownership of the single quorum device 110. In keeping with the invention, in this "single quorum device" configuration, (FIG. 4B), whatever cluster is formed always has the most up-to-date core boot data, since that data is present on the single quorum device 110.

A third alternative in which to ensure data integrity via a quorum storage mechanism 57 is through the use of multiple replica members (typically an odd number thereof such as members $112_1$–$112_3$) for storing the core boot data $102_1$–$102_3$) as represented in FIG. 4C. As set forth in the aforementioned copending U.S. patent application Ser. No. 09/277,450, entitled "Method and System for Consistent Cluster Operational Data in a Server Cluster Using a Quorum of Replicas," each replica member is not the local storage of any particular node, but rather the members form a pool of members that may be owned by any suitable node. In this "quorum of replica members" configuration, (FIG. 4C), the core boot data $102_1$–$102_3$ is replicated to each member $112_1$–$112_3$, and ownership of a quorum (majority) of the possible replica members $112_1$–$112_3$ is needed to form and maintain a cluster. In keeping with the invention, the cluster always has the most up-to-date core boot data since the quorum requirement ensures that at least one replica member that was common to the replica set of the prior cluster is in the replica set of the subsequent cluster. High reliability is achieved via the replication of the data.

As can be readily appreciated, with the present invention, the size of the cluster is ordinarily no longer limited by updates to the cluster configuration data 106, since such updates may be made to a higher performance storage mechanism (e.g., $108_1$). Moreover, because updates to the core boot data 102 are relatively rare, the size of a cluster may be significantly increased.

Figure 5A:
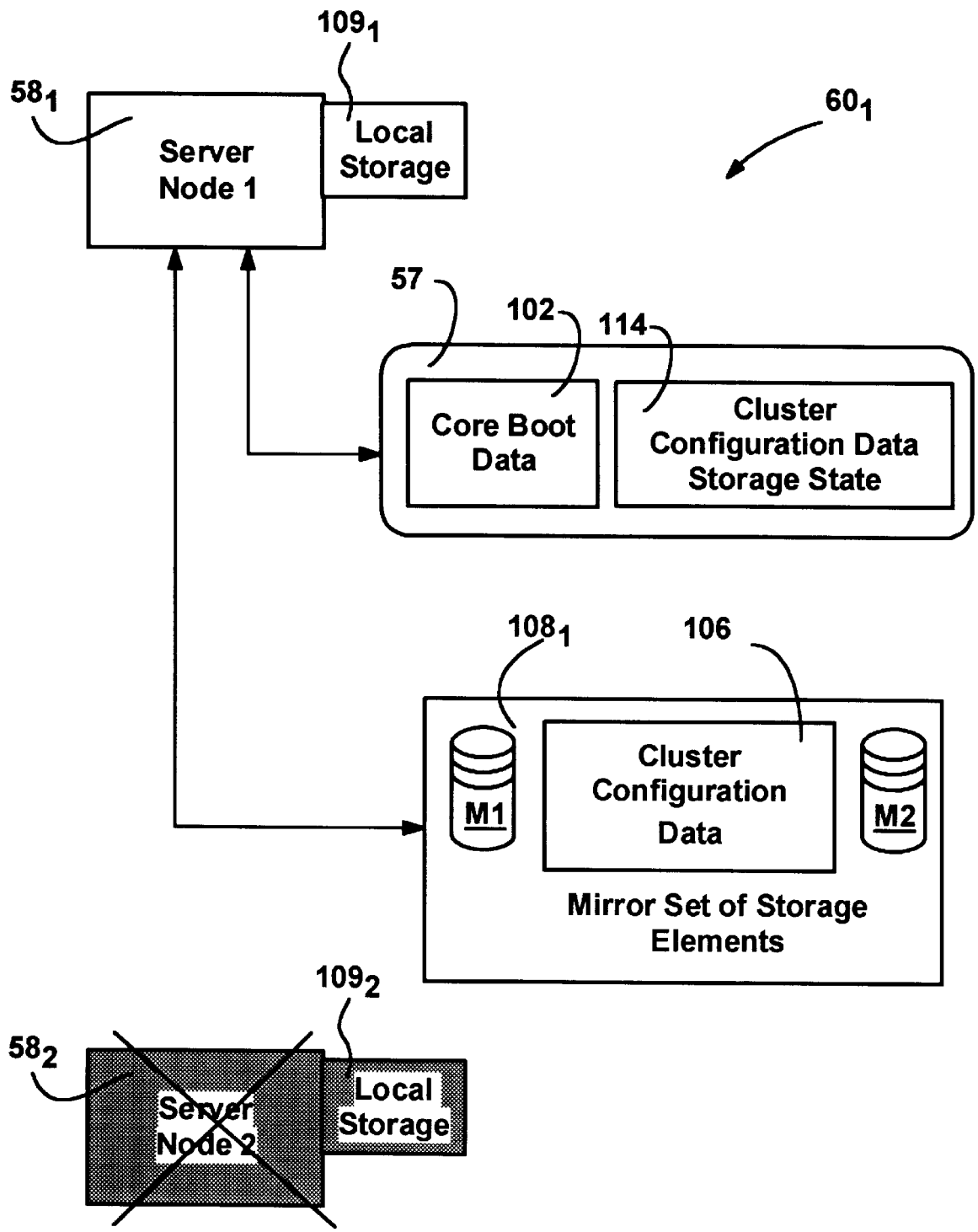
FIGS. 5A–5C are exemplary block diagrams representing a cluster having a mirror set of storage elements for storing cluster configuration data wherein elements of the mirror set fail over time.

In accordance with another aspect of the present invention, state information 114 (FIG. 5A) of the cluster configuration data 106, such as the identity, location and state of the storage device or devices (e.g., $108_1$) on which the cluster configuration data 106 is stored, is maintained in the quorum storage 57 along with (or included as part of) the core boot data 102. This state information 114 ensures the integrity of the cluster configuration data 106, as it allows the state of a partitioned mirror set to be known.

Figure 5B:
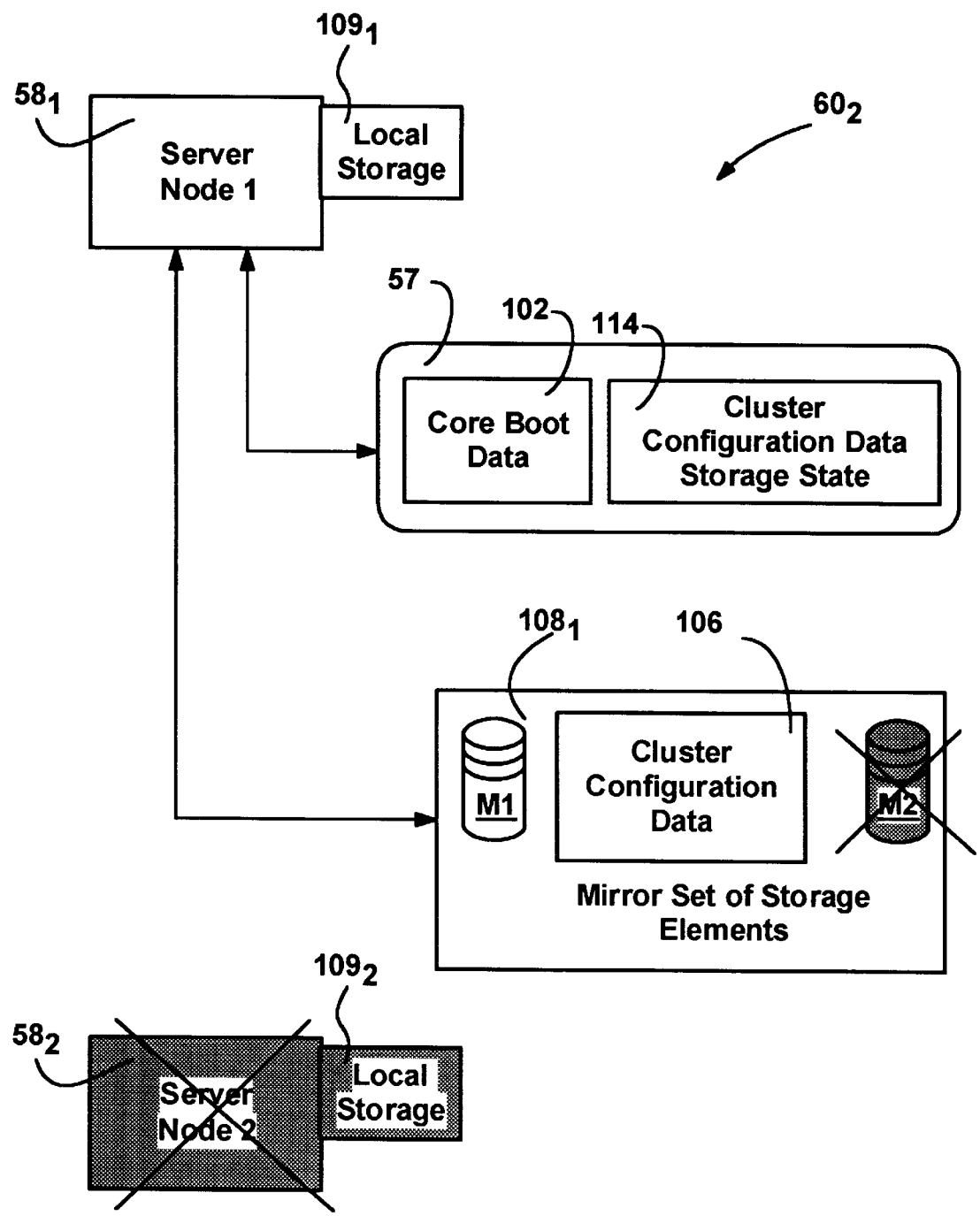
Figure 5C:
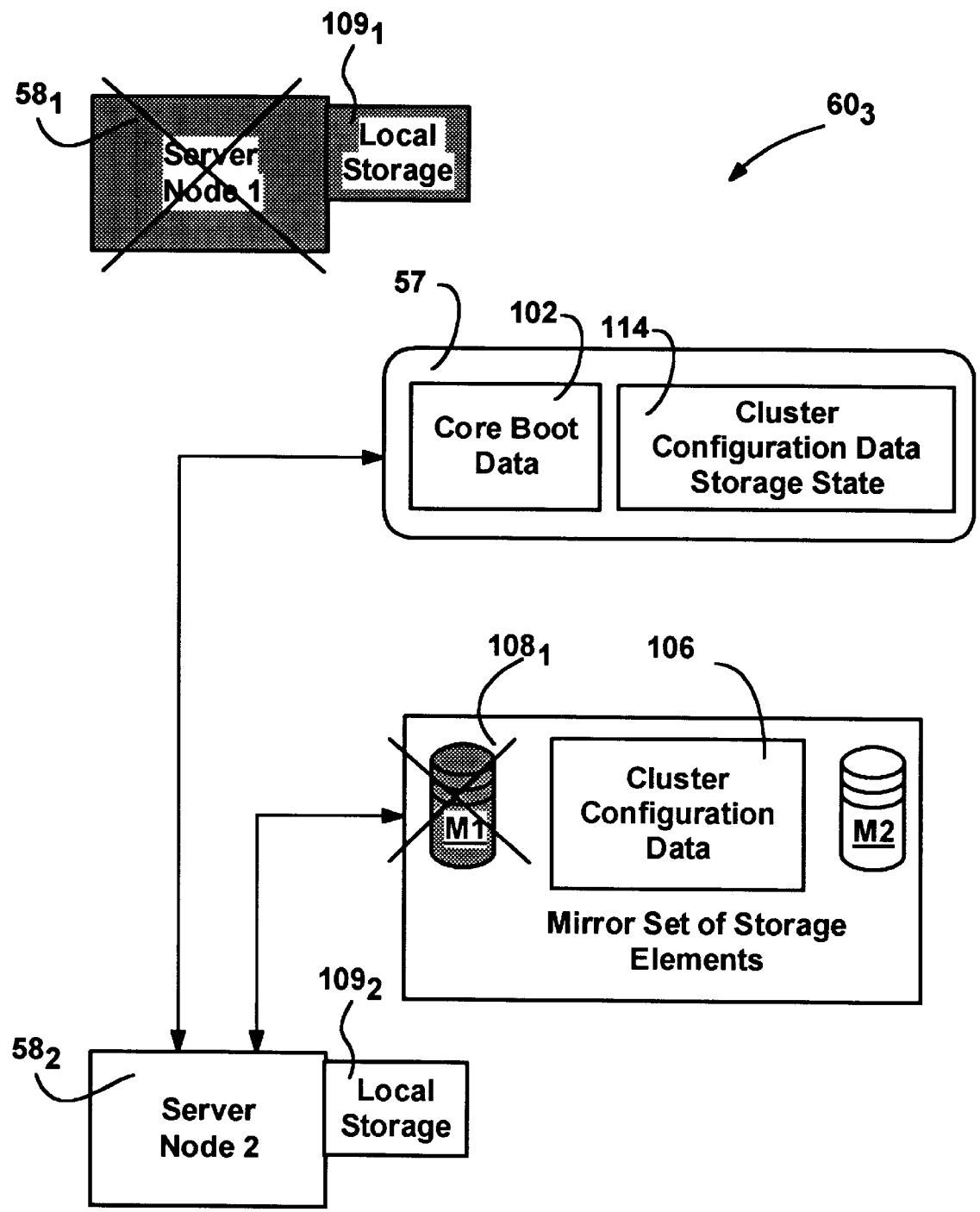

More particularly, storing the state information allows the use of a higher performance and/or lower cost (relative to the quorum storage) two-element mirror set $108_1$ for storing the cluster configuration data 106, by solving a "split mirror" problem in which different storage elements may unknowingly be used in different clusters. By way of example, consider a hypothetical scenario wherein a mirror set $108_1$ (FIG. 5A) is used to store the cluster configuration data 106, however the state 114 of that mirror set $108_1$ is not maintained in the quorum storage 57. If, as represented in FIG. 5B, the disk M2 became inaccessible for some reason (such as a cable to the disk being unplugged), a node such as $58_1$ would reconfigure the mirror set $108_1$ such that M2 was no longer a valid member of that mirror set. However, if the node $58_1$ only recorded this reconfiguration information on its local storage $109_1$, and it was not stored/replicated to the quorum storage 57, then no cluster nodes other than the node $58_1$ would have knowledge of this change. Thereafter, the node $58_1$ would continue to use the accessible element M1 to record new information, but would not be able to record that information on disk M2. If a new cluster $60_3$ is later started with another node $58_2$ and M2 is again made operational (FIG. 5C), but this time the cluster $60_c$ operates without the node $58_1$ or its local storage $109_1$, and also operates without the storage element M1 (which, for example, may have become inadvertently unplugged while M2 was being reconnected), the new node $58_2$ could only see the disk M2. Since the node 582 retains old knowledge in its storage $109_2$ that the mirror set elements M1, M2 are a valid set $108_1$, the node $58_2$ would use M2 as if were still a valid member of that set $108_1$, thereby losing any record of the most-recent configuration information 106.

To avoid these types of scenarios, the prior cluster $60_1$, records in the quorum storage 57 the configuration change that M2 (FIG. 5B) was removed (disabled) from the mirror set $108_1$. The information is recorded as state information 114 into the quorum storage 57 that is present in any cluster that is formed and maintained. As before, the node $58_1$ continues to operate using only disk M1. However, in accordance with the present invention, when the node $58_2$ later starts the new cluster $60_3$, the configuration information 106 including the state of M1 and the disabled state of M2 is available thereto from the quorum storage 57, since some type of ownership of this data is required to form the cluster $60_3$. The node $58_2$ is thus made aware that M2 was removed from the mirror set $108_1$, whereby even though the node $58_2$ may access only disk M2 of the mirror set 120, the cluster $60_3$ will not use M2's data since the node $58_2$ now knows that the data on M2 is stale. When M1 and M2 recover, M2's data is known to be invalid, and M2 is thus updated with data from M1 before being again used for maintaining the cluster configuration data 106. As a result, the cluster configuration data 106 is highly available, while the integrity of the cluster configuration data 106 is preserved, without having to store the configuration data 106 itself on the relatively expensive and/or lower performance quorum storage 57, e.g., three-element mirror set or hardware RAID solution.

Figure 6A:
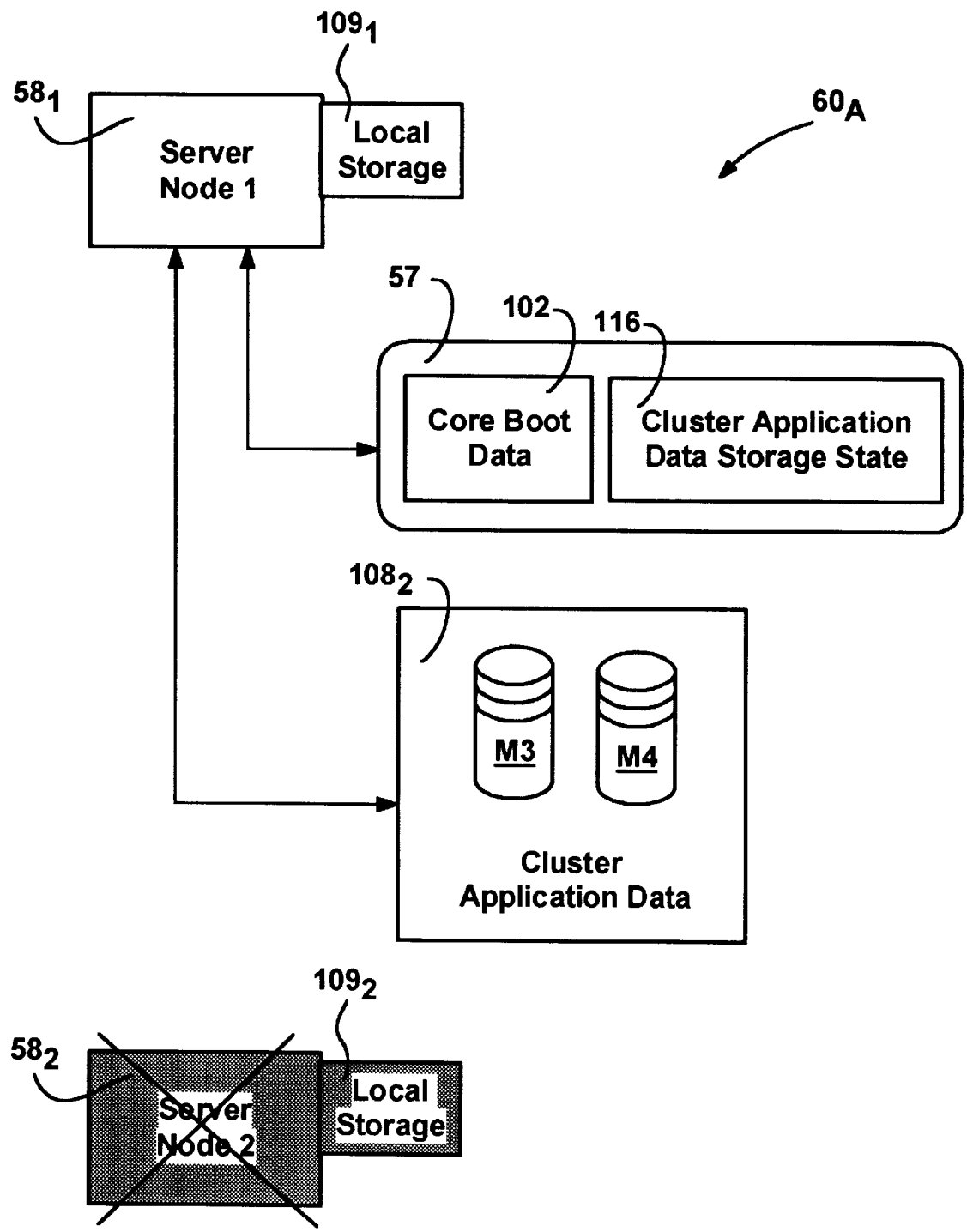
FIGS. 6A–6C are exemplary block diagrams representing a cluster having a mirror set of storage elements for storing cluster application data wherein elements of the mirror set fail over time.
Figure 6B:
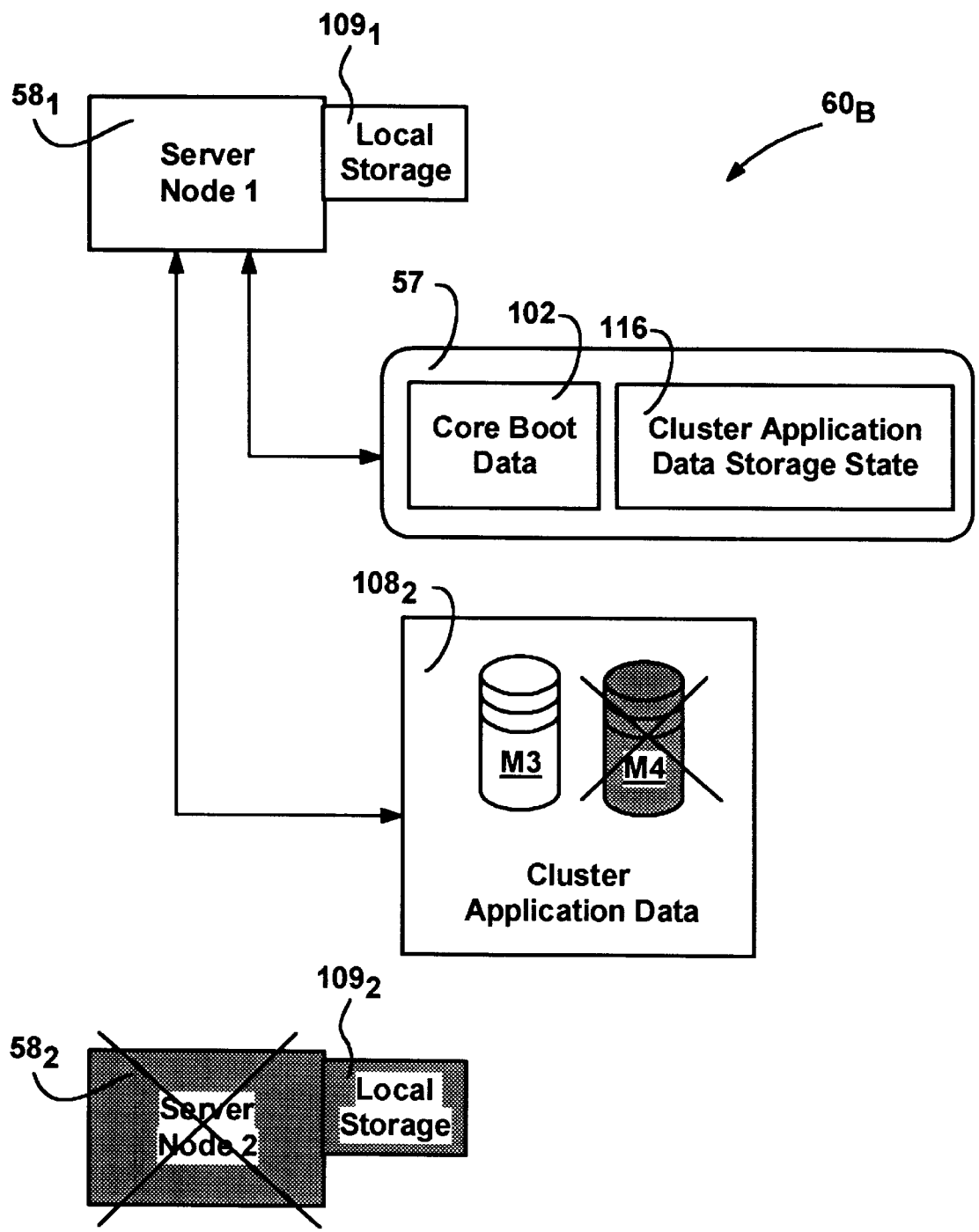
Figure 6C:
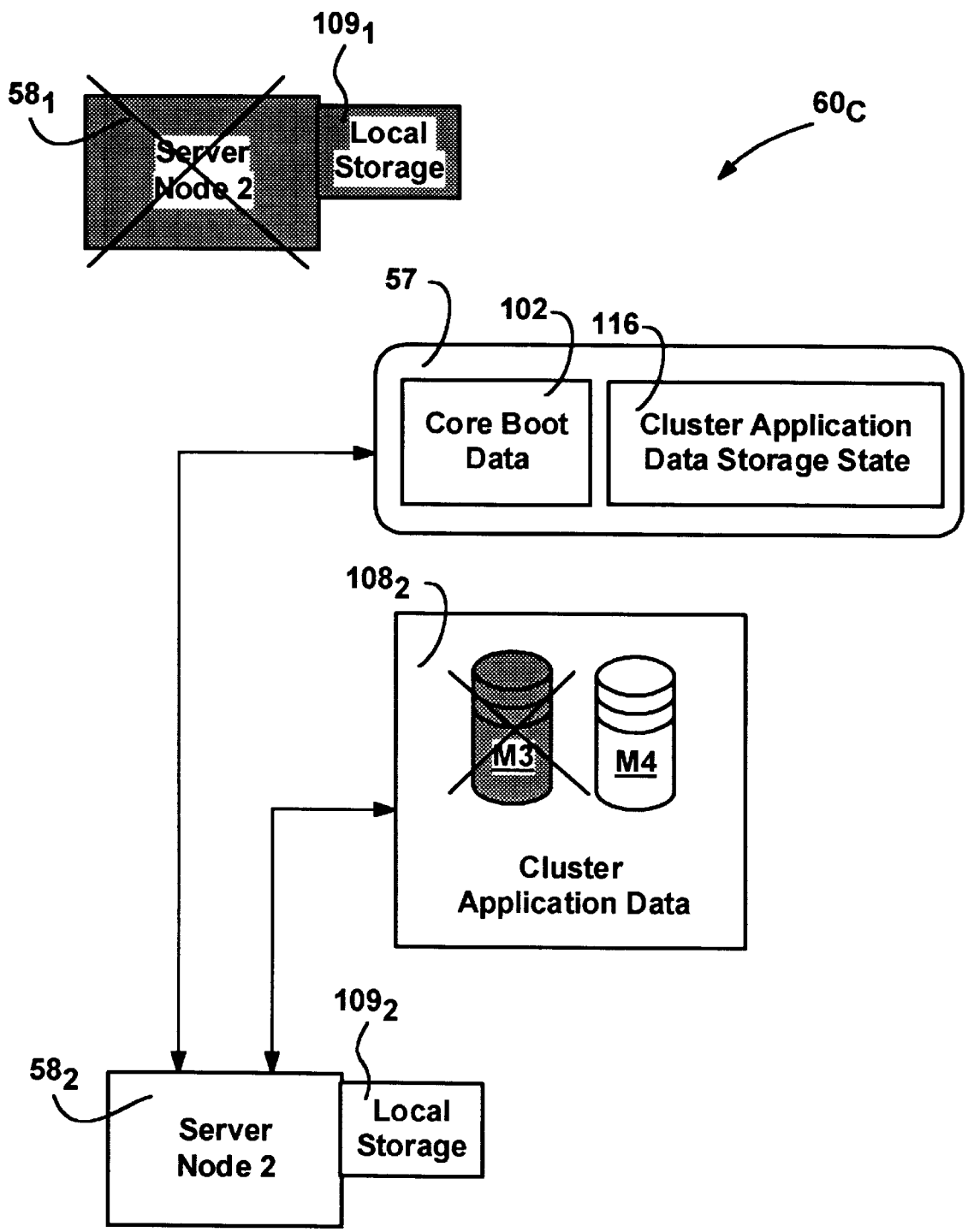

The concept of storing state information of the configuration data storage elements in the quorum storage 57, in accordance with one aspect of the present invention, may be extended to other types of data. For example, as shown in FIGS. 6A–6C, application data is stored on a mirror set $108_2$ having storage elements M3 and M4. By storing the state information of the application data on the in the quorum storage 57, any cluster $60_A$–$60_c$ that is formed will know whether the elements M3 or M4 have the latest transactions thereon and are thus safe to use. As a result, a mirror set may be used for application data, whereby the application data is highly available and consistent with good performance and relatively low cost. Alternatively, if the cluster configuration data 106 is known to be reliable because its state 114 (FIG. 5A) is maintained in the quorum storage 57, the other state information 116 (FIG. 6A) for other data may be maintained with the cluster configuration data 106. Such a multi-level arrangement (i.e., storing the state 116 with a storage $108_1$ that has its state 114 maintained on the quorum storage 57) may be worthwhile if a large amount of other state data 116 needed to be maintained, or if updates thereto were frequent.

Notwithstanding, such other state information 116 is generally small in amount and updated relatively infrequently, e.g., on disk failures, and thus the other state information 116 may ordinarily be stored directly on the highly-reliable quorum storage 57.

While the invention is susceptible to various modifications and alternative constructions, certain illustrated embodiments thereof are shown in the drawings and has been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system of distributing data in a server cluster, comprising, a first storage mechanism having cluster core boot data stored thereon, a second storage mechanism having cluster configuration data stored thereon, and at least one node including a cluster service for logging change information related to the core boot data to the first storage mechanism, and for logging changes to the cluster configuration data to the second storage mechanism.

2. The system of claim 1 wherein the first storage mechanism comprises a plurality of nodes, each node having storage therewith.

3. The system of claim 1 wherein the first storage mechanism comprises a single quorum device.

4. The system of claim 1 wherein the first storage mechanism comprises a plurality of replica devices.

5. The system of claim 4 wherein the node obtains control over a quorum of replica devices.

6. The system of claim 1 wherein the first storage mechanism further maintains state information of the second storage mechanism.

7. The system of claim 1 wherein the second storage mechanism comprises a plurality of storage elements.

8. The system of claim 7 wherein the first storage mechanism further maintains state information of the cluster configuration data, the state information comprising the status of each of the plurality of storage elements.

9. The system of claim 1 wherein the first storage mechanism further maintains state information of other cluster data.

10. The system of claim 9 wherein the other cluster data is maintained on a plurality of storage elements.

11. The system of claim 10 wherein the state information comprises the status of each of the plurality of storage elements.

12. The system of claim 1 wherein the second storage mechanism further maintains state information of other cluster data.

13. The system of claim 12 wherein the other cluster data is maintained on a plurality of storage elements.

14. The system of claim 13 wherein the state information comprises the status of each of the plurality of storage elements.

15. A method of accessing data for operating a server cluster, comprising the steps of, storing cluster core boot data on a first storage mechanism, storing cluster configuration data on a second storage mechanism, storing state information of the cluster configuration data on the first storage mechanism, accessing the first storage mechanism by a node forming a cluster to obtain the core boot data, accessing the first storage mechanism to determine the state of the second storage mechanism from the state information, evaluating the state information, and if the state information indicates the state of the second storage mechanism is valid, accessing the second storage mechanism to obtain the cluster configuration data.

16. The method of claim 15 wherein the step of storing the cluster core boot data comprises the steps of, replicating the core boot data to a quorum of nodes, and storing the core boot data with each of the nodes.

17. The method of claim 15 wherein the step of storing cluster core boot data comprises the step of storing the cluster core boot data on a single quorum device.

18. The method of claim 15 wherein the step of storing cluster core boot data comprises the step of storing the cluster core boot data on a quorum of replica devices.

19. The method of claim 15 wherein the second storage mechanism comprises a plurality of storage elements, and wherein the step of evaluating the state information includes the step of determining if at least one of the plurality of storage elements is valid.

20. The method of claim 15 further comprising the step of maintaining state information of at least one other storage device used to store other cluster data.

21. The method of claim 20 wherein the other cluster data is stored on a plurality of storage elements, and further comprising the step of evaluating the state information of the other cluster data by determining whether at least one of the plurality of storage elements is valid.

22. A computer-readable medium having computer executable instructions for performing the steps of claim 15.

23. A method of distributing data in a server cluster, comprising the steps of, storing cluster core boot data on a quorum storage, including replicating the core boot data to a plurality of nodes and storing the core boot data with each of the nodes, and storing cluster configuration data on another storage device of the cluster.

24. The method of claim 23 further comprising, maintaining, on the quorum storage, state information of the other storage device used to store the cluster configuration data.

25. The method of claim 24 wherein the other storage device used to store the cluster configuration data comprises a mirror set of storage elements, and wherein maintaining state information comprises recording information indicating that at least one of the storage elements is disabled.

26. The method of claim 24 wherein the other storage device used to store the cluster configuration data comprises a mirror set of storage elements, and wherein maintaining state information comprises recording information indicating that at least one of the storage elements is enabled.

27. The method of claim 23 further comprising, maintaining state information of at least one additional storage device used to store other cluster data.

28. The method of claim 27 wherein the state information of at least one additional storage device used to store other cluster data is maintained in the quorum storage.

29. The method of claim 27 wherein the state information of at least one additional storage device used to store other cluster data is maintained in the other storage device.

30. The method of claim 27 wherein the other cluster data is maintained on a mirror set of storage elements, and wherein maintaining state information comprises recording information indicating that at least one of the storage elements is disabled.

31. The method of claim 27 wherein the other cluster data is maintained on a mirror set of storage elements, and wherein maintaining state information comprises recording information indicating that at least one of the storage elements is enabled.

32. A computer-readable medium having computer executable instructions for performing the method of claim 23.

33. A method of distributing data in a server cluster, comprising, storing cluster core boot data on a quorum storage including storing the cluster core boot data on a single quorum device, and storing cluster configuration data on another storage device of the cluster.

34. The method of claim 33 further comprising, maintaining, on the quorum storage, state information of the other storage device used to store the cluster configuration data.

35. The method of claim 34 wherein the other storage device used to store the cluster configuration data comprises a mirror set of storage elements, and wherein maintaining state information comprises recording information indicating that at least one of the storage elements is disabled.

36. The method of claim 34 wherein the other storage device used to store the cluster configuration data comprises a mirror set of storage elements, and wherein maintaining state information comprises recording information indicating that at least one of the storage elements is enabled.

37. The method of claim 33 further comprising, maintaining state information of at least one additional storage device used to store other cluster data.

38. The method of claim 37 wherein the state information of at least one additional storage device used to store other cluster data is maintained in the quorum storage.

39. The method of claim 37 wherein the state information of at least one additional storage device used to store other cluster data is maintained in the other storage device.

40. The method of claim 37 wherein the other cluster data is maintained on a mirror set of storage elements, and wherein maintaining state information comprises recording information indicating that at least one of the storage elements is disabled.

41. The method of claim 37 wherein the other cluster data is maintained on a mirror set of storage elements, and wherein maintaining state information comprises recording information indicating that at least one of the storage elements is enabled.

42. A computer-readable medium having computer executable instructions for performing the method of claim 33.

43. A method of distributing data in a server cluster, comprising the steps of, storing cluster core boot data on a quorum storage including storing the cluster core boot data on a plurality of replica devices, and storing cluster configuration data on another storage device of the cluster.

44. The method of claim 43 further comprising, maintaining, on the quorum storage, state information of the other storage device used to store the cluster configuration data.

45. The method of claim 44 wherein the other storage device used to store the cluster configuration data comprises a mirror set of storage elements, and wherein maintaining state information comprises recording information indicating that at least one of the storage elements is disabled.

46. The method of claim 44 wherein the other storage device used to store the cluster configuration data comprises a mirror set of storage elements, and wherein maintaining state information comprises recording information indicating that at least one of the storage elements is enabled.

47. The method of claim 43 further comprising, maintaining state information of at least one additional storage device used to store other cluster data.

48. The method of claim 47 wherein the state information of at least one additional storage device used to store other cluster data is maintained in the quorum storage.

49. The method of claim 47 wherein the state information of at least one additional storage device used to store other cluster data is maintained in the other storage device.

50. The method of claim 47 wherein the other cluster data is maintained on a mirror set of storage elements, and wherein maintaining state information comprises recording information indicating that at least one of the storage elements is disabled.

51. The method of claim 47 wherein the other cluster data is maintained on a mirror set of storage elements, and wherein maintaining state information comprises recording information indicating that at least one of the storage elements is enabled.

52. A computer-readable medium having computer executable instructions for performing the method of claim 43.

\* \* \* \* \*

UNITED STATES PATENT AND TRADEMARK OFFICE
CERTIFICATE OF CORRECTION

PATENT NO.   : 6,453,426 B1
DATED        : September 17, 2002
INVENTOR(S)  : Gamache et al.

It is certified that error appears in the above-identified patent and that said Letters Patent is hereby corrected as shown below:

Column 2,
Lines 49-50, "permitting. the use" should read -- permitting the use --.
Line 3, "device for" should read -- devices for --.

Column 7,
Line 54, "e.g." should read -- e.g., --.

Column 12,
Line 17, "582" should read -- $58_2$ --.
Line 19, "as if were" should read -- as if it were --.
Line 36, "mirror set 120" should read -- mirror set $108_2$ --.
Line 53, "on the in the quorum" should read -- in the quorum --.

Column 15,
Line 26, "stat e information" should read -- -state information --.

Signed and Sealed this

Sixteenth Day of November, 2004

JON W. DUDAS
*Director of the United States Patent and Trademark Office*